(No Model.)
C. BREITENKAMM.
DEVICE FOR COATING CONFECTIONS.
No. 542,987. Patented July 23, 1895.
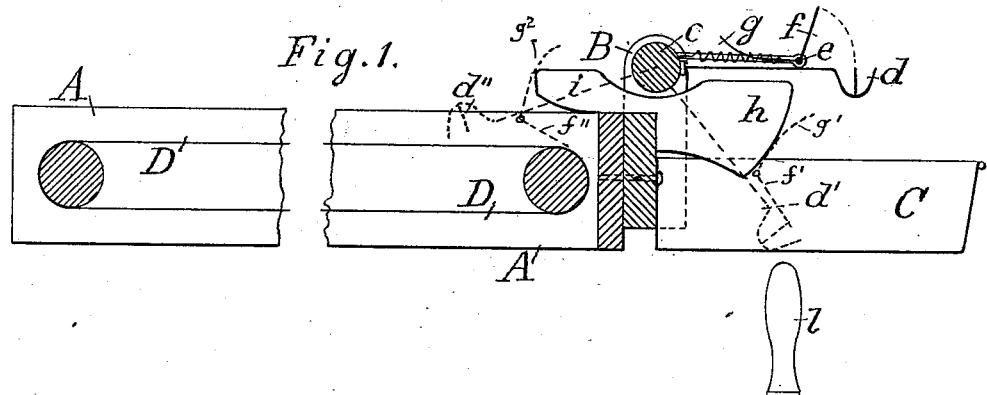
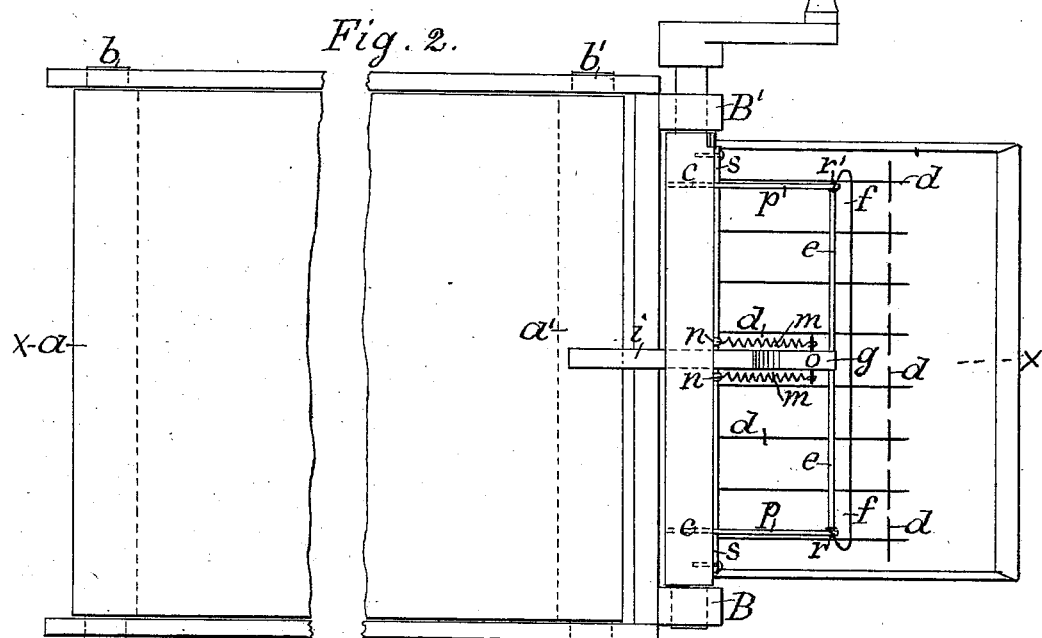
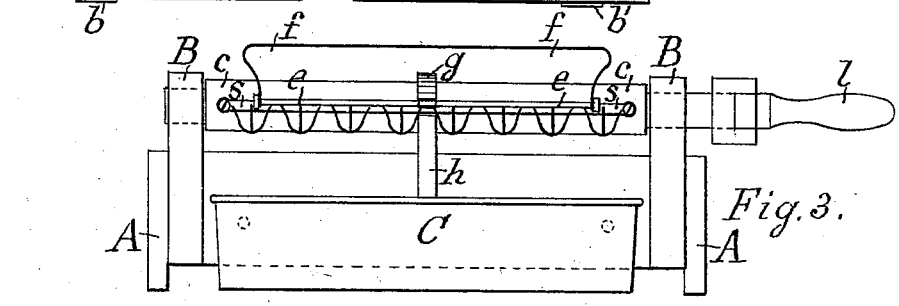
WITNESSES:
Frederick J. MacMahon
Wm. M. Drew
INVENTOR
Charles Breitenkamm
BY John F. Kerr
ATTORNEY.

UNITED STATES PATENT OFFICE.

CHARLES BREITENKAMM, OF PATERSON, NEW JERSEY.

DEVICE FOR COATING CONFECTIONS.

SPECIFICATION forming part of Letters Patent No. 542,987, dated July 23, 1895.

Application filed February 4, 1895. Serial No. 537,151. (No model.)

*To all whom it may concern:*

Be it known that I, CHARLES BREITENKAMM, of the city of Paterson, county of Passaic and State of New Jersey, have invented certain new and useful Improvements in Devices for Manufacturing Bonbons and other Like Confections, of which the following is a specification.

The object of my invention is to provide a device which from its simplicity of construction and ease of operation will greatly facilitate the manufacture of bonbons, chocolate-cream drops, and other like confections that require an immersion or dipping in any liquid for the purpose of being coated, as, for instance, in liquid cream or chocolate.

In the manufacture of chocolate-cream drops or bonbons it is customary to form or mold the drops or bonbons into the desired shape and by placing therein nuts or fruits of various kind and to dip the drops by hand one at a time into the melted chocolate, or in some cases a device holding one drop is used for immersing the drop into the cream or chocolate, as the case may be. This process is very slow, and the object of my invention is to produce a device that may be operated easily and facilitate the manufacture of chocolate-cream drops or bonbons by enabling the confectioner to dip fifty or more drops, or so many as desired, at one immersion, and thus secure a coating of cream or chocolate that will be uniform or alike on all the drops.

In the accompanying drawings, in which similar letters of reference indicate like parts, Figure 1 is a view in section of the device on the line $x\ x$ in Fig. 2, part being broken away. Fig. 2 is a plan view of the device, part being broken away; and Fig. 3 is a front end of the device.

The invention consists of a pan or dish to hold the liquid secured to a frame or box containing rollers around which is stretched oil-cloth or suitable material, and a shaft $c$ mounted on said frame between the said dish and said rollers; a bar attached to said shaft, to which bar are secured hands or receptacles composed of wire or other suitable material and adapted to receive the confections to be immersed in the pan of liquid; a bar fulcrumed at each end to short bars or arms, which are secured to the said shaft; a holding-down wire, which is fastened to the bar, which is fulcrumed on said short arms, and a tongue which is attached to the bar fulcrumed on said short arms, and at the center of said bar to said tongue are secured springs, the other ends of the springs being attached to the shaft. Under the shaft and to the framework of box is secured a piece of wood or other suitable material, shaped as shown in Fig. 1, so as to form stationary cams adapted to govern the motion of the said tongue and the holding-down wire.

The holding-down wire is adapted to retain in and prevent the confections from falling from the said hands or receptacles while being dipped.

The shaft is turned by means of a crank secured to one end thereof.

In the drawings, A A is the frame of box.

$b$ and $b'$ are bearings therein for the rollers $a\ a'$. D D is the oil-cloth or other material which is stretched over said rollers.

B' B are bearings for a shaft $c\ c$, to which is attached the crank $l$.

$s\ s$ is a small bar which is fastened to the shaft $c\ c$, to which bar are attached the hands $d\ d\ d$, as many as are required. Short arms or bars $p\ p$ are secured to the shaft $c\ c$. On said short arm is fulcrumed at each end the wire $e\ e$, as shown at $r\ r'$.

$f\ f$ is a holding-down wire which is fastened to the wire $e\ e$ at the end near the fulcrums $r\ r'$.

$g$ is the tongue which is attached to the center of the wire bar $e\ e$, to which are secured one end of the springs $m\ m$ at $o$. The other ends of the springs are attached to the shaft at $n\ n$.

Stationary cams $h$ and $i$ are secured to the frame A, the cam $h$ extending over and into the dish or pan C, which holds the liquid into which the confections are dipped, and the cam $i$, extending over the box containing the rollers and endless belt of oil-cloth, adapted to receive the confections after their immersion and to convey them into a suitable receptacle when dried.

The pan C may be made of any suitable material for the purpose of holding the liquid required.

The dotted lines $d'\ d''$ in Fig. 1 indicate the position of the hands $d$, and the dotted lines $f'$ $f''$ the position of the holding-down wire $f$, and the dotted lines $g'$ $g''$ the position of the tongue $g$ when the confections are being immersed in the liquid, and when they are being dropped from the hands onto the revolving oil-cloth in the box, respectively.

The cam $h$ by acting upon the tongue $g$ keeps the holding-down wire over the hands $d$ while the drops are being immersed, and when the shaft is turned over in the opposite direction the cam $i$, by engagement with the tongue $g$, causes the holding-down wire $f$ to leave the hands $d$, so that the drop may fall from the hands $d$, as shown by the dotted lines in Fig. 1.

By arranging a large number of hands as shown and herein described a great many confections or drops may be dipped at one immersion all receiving an equal coating, and when removed from the liquid may be deposited on the endless belt of cloth surrounding the rollers and thus be conveyed to any desired receptacle at a great saving of expense and labor.

With this description of my invention, what I claim is—

1. In a device for coating bon-bons and other like confections, a dish or receptacle for holding liquid coating substance, a frame secured to one side thereof, a shaft mounted and adapted to turn in bearings on said frame, hands or pockets secured to said shaft and adapted to hold bon-bons or other confections to be coated, arms, shorter than the arms of hands or pockets, also secured to said shaft, a bar fulcrumed at each end to the short arms or bars secured to the shaft, and a bow of wire or other suitable material secured to the bar which is fulcrumed on said short arms and almost at right angles thereto and adapted when bent downwardly to cover the bon-bons contained in the pockets and to hold them therein, a stationary cam centrally located under shaft, and on the frame secured to the end of the liquid receptacle, said cam extending over the liquid receptacle, a tongue secured to the central portion of bar which is fulcrumed on said short arm and springs secured to said tongue at one end and the other ends of springs being attached to the shaft and adapted to hold said tongue, when shaft is not being operated, on the top of the stationary cam which projects over the liquid receptacle, and also adapted to keep the holding down device free from the hands or pockets, when device is not in operation, said cam when the shaft is turned adapted to govern the motion of the tongue, holding down wire and bar which is fulcrumed on short arms, substantially as shown and described and for the purpose specified.

2. In a device for manufacturing bon-bons and other like confections, the combination with a liquid receptacle, a box or frame, rollers mounted to turn therein, and an endless belt of suitable fabric stretched around said rollers, of a shaft suitably mounted on bearings on said frame and adapted to turn therein, hands or pockets secured to said shaft, arms secured to said shaft, which are shorter than arms of pockets a bar fulcrumed at each end to said short arms, a holding down wire secured to said last mentioned bar, a tongue secured to the central portion of said last mentioned bar, springs connecting said tongue and shaft, stationary cams secured to the central portion of the frame, under said shaft, one cam projecting over the liquid receptacle, the other projecting over the box containing the endless belt, the whole constructed and adapted to be operated substantially as shown and described and for the purpose specified.

CHARLES BREITENKAMM.

Witnesses:
KATIE BREITENKAMM,
WM. M. DREW.